United States Patent [19]

Tolley

[11] Patent Number: 4,673,160
[45] Date of Patent: Jun. 16, 1987

[54] DIGITAL SERVO-VALVE

[75] Inventor: Patrick Tolley, Downsview, Canada

[73] Assignee: Hydracine Fluid Power Limited, Downsview, Canada

[21] Appl. No.: 841,541

[22] Filed: Mar. 19, 1986

[30] Foreign Application Priority Data

Nov. 14, 1985 [CA] Canada .................................. 495293

[51] Int. Cl.[4] .............................................. F16K 31/04
[52] U.S. Cl. .......................... 251/129.05; 251/129.08; 251/129.11; 137/625.46
[58] Field of Search ...................... 251/129.08, 129.11, 251/129.05

[56] References Cited

U.S. PATENT DOCUMENTS

| | | | |
|---|---|---|---|
| 4,097,786 | 6/1978 | Lund | 251/129.11 X |
| 4,203,573 | 5/1980 | Boss | 251/129.11 |
| 4,386,626 | 6/1983 | Hehl | 251/129.08 X |
| 4,428,558 | 1/1984 | Odogaki et al. | 251/129.08 X |
| 4,431,161 | 2/1984 | Miller et al. | 251/129.11 |

FOREIGN PATENT DOCUMENTS 1216890 12/1970 United Kingdom ........... 251/129.11

Primary Examiner—Arnold Rosenthal
Attorney, Agent, or Firm—Ivor M. Hughes

[57] ABSTRACT

An hydraulic rotary valve is provided which permits the accurate control in an open loop system of the position of a valve plate in the rotary valve for directing the flow or pressure between multiple flow paths. Mechanical centering means are provided for returning the valve plate to a predetermined closed position whenever power is turned off or lost to a stepper motor comprising valve actuating means. A stepper motor is linked to the valve plate and machine intelligence means for controlling the operation of the stepper motor are provided, including means for registering the position of the valve plate when mechanically returned to a predetermined closed position, determining the required number of electrical pulses at the desired frequency sufficient to activate the stepper motor for a predetermined number of degrees of rotation of the output shaft to advance or return (in clockwise or counterclockwise rotation) the valve plate to a desired position. No feed back sensors are required to constantly measure the actual position of the valve plate.

1 Claim, 8 Drawing Figures

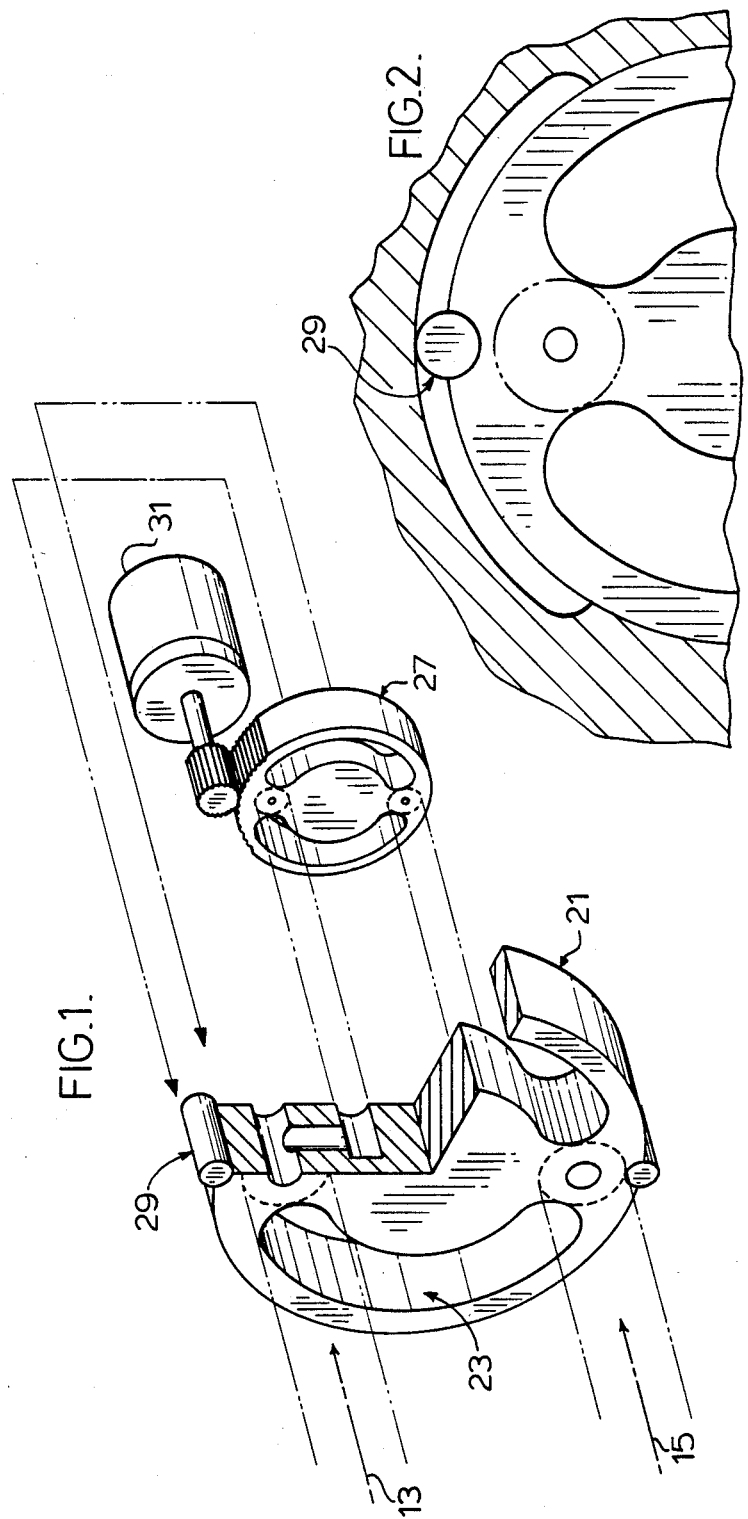

DIGITAL SERVO-VALVE

FIELD OF INVENTION

This invention relates to a hydraulic valve and components therefore, and in one aspect is adapted to permit the accurate control in an open loop system of the position of a valve plate in a rotary valve for directing the flow or pressure between multiple flow paths.

BACKGROUND OF INVENTION

A variety of valve devices are in use for controlling the flow of fluids communicating from a supply port to a service port through an actuating member. In a rotary valve it is known to use a circular valve plate rotatable about a central axis having fluid channels on one plane thereof. The valve plate abuts one plane of a valve body having supply ports and service ports spaced apart. The valve plate may be rotated so as to align the fluid channels with the supply ports and service ports presenting an orifice to one plane of the valve body, thereby diverting the flow of fluid from a supply port to a service port. In a rotary valve, usually the fluid channel is kidney-shaped and the supply ports and service ports in the valve body are spaced apart in an annular configuration corresponding to the kidney-shaped sector defined by the fluid channel. As it may be desirable to control the supply of fluid to more than one service port, one valve plate may have a plurality of kidney-shaped fluid channels which may be spaced one from the other about a common axis, either circumferentially an equal radial distance from the centre or concentrically a varying radial distance from the common central axis. A plurality of supply ports and service ports may be spaced concentrically in one plane of the valve body so as to correspond to the plurality of fluid channels carried by the rotatable valve plate. In a rotary valve having a plurality of fluid channels for selectively interconnecting a plurality of ports it is therefore necessary to accurately control the angle of rotation of the valve plate in order to provide intermediate positions of adjustment, thereby directing multiple flow paths.

It has been known to utilize an electric motor to rotate a valve plate in a rotary valve, wherein the rotational torque of the electric motor is proportional to the magnitude of the current supplied to the motor. However, it has not been possible with such torque motors to achieve a predetermined angle of rotation sufficient to control in discrete increments the position of an actuating member, without the use of feedback means to determine the position of the actuating member, that is a "closed loop system".

U.S. Pat. No. 4,339,737 ("Meyers") 1982, teaches an electrically actuated rotor for controlling the flow of fuel in an internal combustion engine. As noted in Meyers, the rotor portion of the structure need not be limited to a valve device utilized in a fuel line of an internal combustion engine, and may be employed as an actuator per say. A rotor is provided which is adapted to rotate within a predetermined sector to normally assume one of two positions. A coil is provided to which current is applied to generate a magnetic field. Circumferentially spaced magnetic pole means are provided in proximity to the coil whereby when current is applied to the coil the rotor assumes a predetermined position of rotary adjustment responsive to the magnetic field generated by the energized coil. When the current is removed from the coil the rotor is biased to normally assume a predetermined position. It will be appreciated that in Meyers only two positions of adjustment are possible and no intermediate position of adjustment are possible.

U.S. Pat. No. 4,345,228 ("Idogaki") relates to an electric motor mechanically linked to an actuating member in a rotary valve. The actuating member is rotatable by means of the electric motor which is operable to produce a torque proportional to the magnitude of the input current supplied to the motor. Idogaki teaches that is is known in the prior art to provide a bipolar electric motor of an angle of rotation of less than about 180 degrees having a return coil spring connected to the shaft of the motor "so that the motor shaft is rotated to a position where balance is attained between the driving torque produced electromagnetically in accordance with the input current and the recovery force exerted to the motor shaft by the return spring". However, in such a structure the angle of rotation attained with a given magnitude of input current is greater when current is decreasing than the angle of rotation attained when current is increasing. Idogaki explains this relative hysteresis when current is increasing in prior art devices as arising from "the friction between the motor shaft and bearing, the friction between the turns of the coil spring and so forth". Idogaki therefore provides an electric motor suitable for imparting an angle of rotation of less than 180 degrees having a hollow shaft and tortion bar housed coaxially in the shaft. One end of the tortion bar is fixed to the shaft, the other end to the valve housing. The tortion bar thereby acts against the rotational driving torque of the electric motor. As best as may be determined from the disclosure in Idogaki, the tortion bar stores energy in response to one direction of rotation when the input current is decreasing and releases such energy in response to the direction of rotation when the input current is increasing, thereby reducing the relative hysteresis of the rotational characteristics of the motor when current is increasing. It will be appreciated by those skilled in the art that while Idogaki thereby teaches a structure where the amount of torque applied to the shaft is equalized for two opposite directions of rotation so as to overcome frictional imbalances and hysteresis associated with the electro-magnetic induction, there is still not disclosed a means to control the angle of rotation achieved in discrete increments.

U.S. Pat. No. 4,364,111 ("Jocz") relates to a conventional alternating current motor having its output shaft mechanically linked to an actuating member in a valve. The actuating member is movable by means of rotation of the output shaft of the motor between a first position in which the valve is closed and a second position in which the valve is open. The actuation of the motor is controlled by means of an electronic circuit including a microprocessor comprising control logic, and input signals from optical transducers optically coupled to either the output shaft of the motor or the valve actuating member. The optical transducers generate an electrical signal representative of the direction and degrees of angular rotation of the output shaft. The control logic compares values corresponding to the position of the valve actuator when the valve is fully open and when the valve is fully closed to the value of the input signals from the optical transducers, to generate a value indicative of the current position of the valve actuating member. Means are disclosed to control the magnitude of the input current to the AC motor so as to increase or decrease the rotational torque produced electromagnetically. An amount of torque approximately 50% greater than the average dynamic torque required to drive the valve actuating member may be applied to overcome the relatively greater frictional lag of the valve when the actuator is in the closed position. It will be appreciated by those skilled in the art that "Jocz" discloses sensor feedback means to control the magnitude of the input current supplied to an AC motor as means to increase or decrease the rotational torque produced electromagnetically. It will further be appreciated by those skilled in the art that "Jocz" has addressed the problem associated with torque motors wherein controlling the magnitude of the current applied to the motor will not determine its stopping position, by providing a "closed loop system" comprising feedback sensors.

The use of "closed loop systems" such as that taught by "Jocz" leads to a problem known to those skilled in the art as oscillation or instability. A feedback sensor can only determine when a valve member has reached a known position and will not prevent a valve member from over shooting that position once the feedback signal causes a control unit to cut off power to the motor. To solve this problem the so called "bang bang system" oscillates the motor back and forth to arrive at a position which is an average of the desired stopping point. The effect of such a system is to cause friction which leads to the valve components wearing out.

Inter-Hydraulik A.G., a Swiss company, markets a digitally controlled modulating valve, comprising a rotary stepping motor for actuating the movement of a linear spool valve. When the valve is powered up the linear spool is automatically driven into a null ($\phi$) or home position. A closed loop control system may monitor the movement of the linear spool in relation to the null position and compare same to the control input to the stepper motor. In the event of a loss or interruption of power to the valve however, the known position of the linear spool may be lost. It is therefore an object of this invention to provide an improved rotary valve and components therefore.

Is is a further object of this invention to provide improved means for actuating a valve actuating member in a rotary valve.

It is a further object of this invention to provide improved means for actuating a valve actuating member whereby sensor feedback means for determining the position of the actuating member are not required.

Further and other objects of the invention will be apparent to those skilled in the art from the following summary of the invention and detailed description thereof.

SUMMARY OF INVENTION

According to one aspect of the invention there is provided a rotary valve comprising: (a) a valve body; (b) a plurality of fluid conduits passing through the valve body comprising supply ports and service ports, each port presenting an orifice to one plane of the valve body; (c) a rotatable valve plate for directing multiple flow paths from the plurality of supply ports to the plurality of service ports, the valve plate having a plurality of fluid channels abutting the one plane of the valve body for rotational alignment of the fluid channels with the supply ports and service ports; (d) a stepper motor having an output shaft mechanically coupled to the valve plate, the output shaft rotatable to rotate the valve plate through a range of predetermined positions; (e) mechanical centering means for returning the control plate to a predetermined closed position whenever the power is turned off or lost to the stepper motor, and (f) machine intelligence means for controlling the operation of the stepper motor linked to the valve plate, the machine intelligence means including means for registering the position of the valve plate when mechanically returned to a predetermined closed position, determining the required number of electrical pulses at the desired frequency sufficient to activate the stepper motor for a predetermined number of degrees of rotation of the output shaft to advance or return (in clockwise or counterclockwise rotation) the valve plate to a desired position, whereby the stepping motor will advance and stop the valve plate at the desired position without feedback sensors to constantly measure the actual position of the valve plate.

DESCRIPTION OF DRAWINGS

FIG. 1 is a perspective view of a portion of a rotary valve comprising a main valve plate, pilot valve plate, and stepping motor.

FIG. 2 is a frontal view of a portion of the main valve plate in FIG. 1.

DESCRIPTION OF A PREFERRED EMBODIMENT OF THE INVENTION

Figure 3:
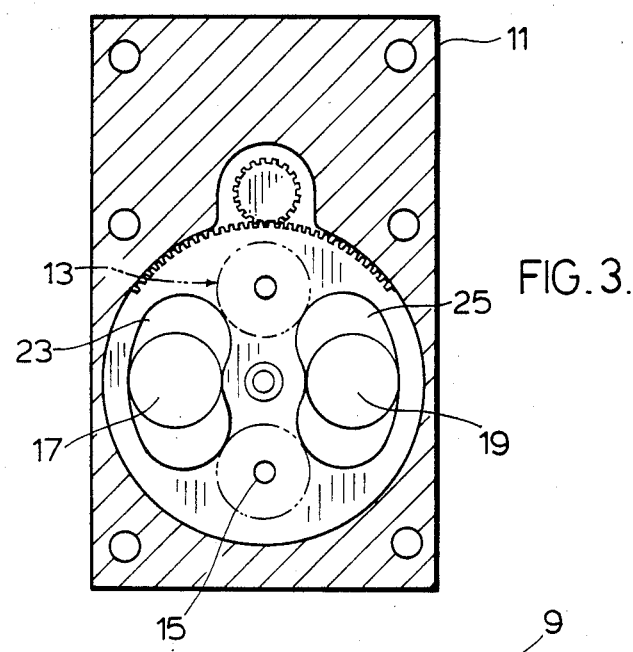
FIG. 3 is a frontal view of a valve body comprising supply ports and service ports, and a valve plate comprising kidney shaped fluid channels.
Figure 4:
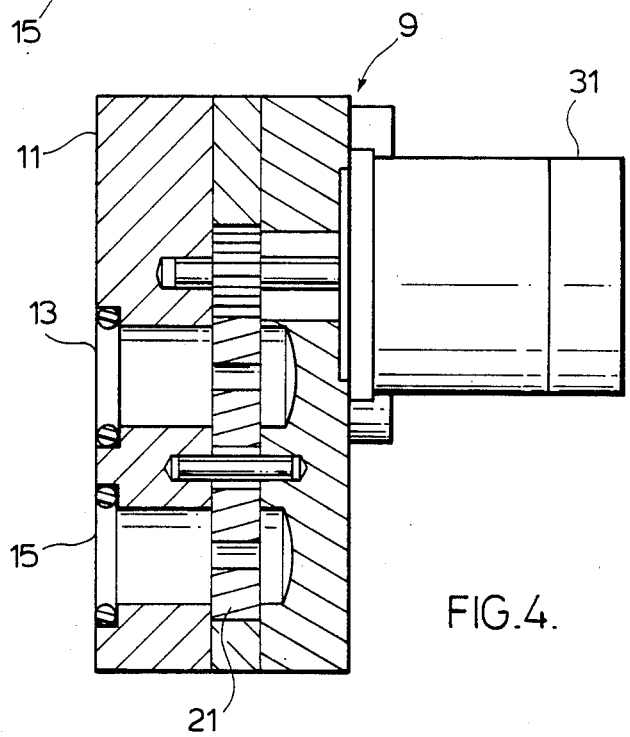
FIG. 4 is a side view of the valve body shown in FIG. 3.
Figure 5:
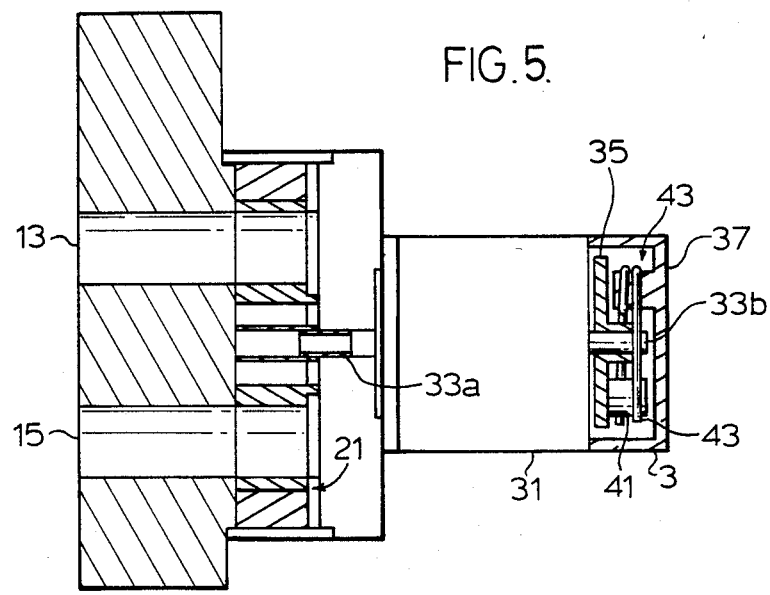
FIG. 5 is a top view of a valve body and valve plate comprising means for mechanically centering the valve plate.

With reference to FIGS. 1, 3, and 4 there is shown a rotary valve 9 comprising a valve body 11, supply ports 13, 15 and service ports 17, 19 spaced apart, and a valve plate 21 having kidney shaped fluid channels 23, 25. The valve plate 21 is rotatable so as to permit alignment of the fluid channels 23, 25 therein with the supply ports 13, 15 and service ports 17, 19 in a plurality of discrete positions from partial to complete alignment. With reference to FIGS. 1 and 2, for valves designed to handle large fluid reservoirs under significant pressure a pilot valve plate 27 is provided in one embodiment, comprising ports to bleed fluid pressure off the supply pressure port 13 and direct pressure to either side of a roll vane 29 for steering the main valve plate 21. A stepping motor 31 mechanically engages the circumference of the pilot valve plate 27. In another embodiment, where the valve does not need to operate under significant pressure, the stepping motor may mechanically engage the circumference of the main valve plate 21, as in FIGS. 3 and 4. With reference to FIG. 5, in another embodiment the stepping motor 31 may engage the central axis of the valve plate 21.

Figure 6B:
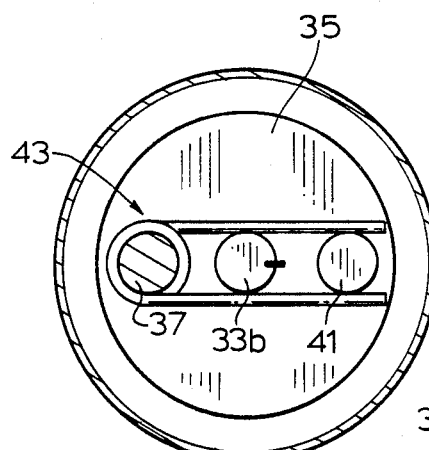
FIG. 6b is a side view along line A—A in FIG. 5, of mechanical centering means in a null ($\phi$) position.
Figure 6A:
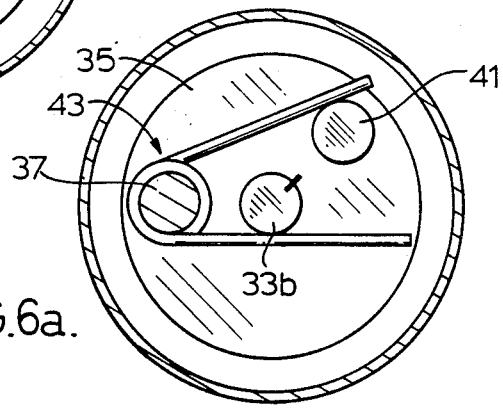
FIG. 6a is a side view, along line A—A in FIG. 5, of mechanical centering means.

With reference to FIGS. 5, 6a, and 6b the shaft 33 of the stepping motor 31 engages the central axis of the valve plate 21 at one end 33a. At the other end remote the valve plate 33b, the shaft engages a circular plate 35 that rotates with the shaft 33. A stationary pin 37 is attached to the stepping motor housing 39. A movable pin 41 is attached to the circular plate 35 and rotates with the motor 31. A clip or spring 43 is attached to the stationary pin 37 and clamps either side of the movable pin 41. When the stepping motor 31 is not energized or rotating, the spring 43 returns the shaft 33 of the motor 31 to a null ($\phi$) position.

Figure 7:
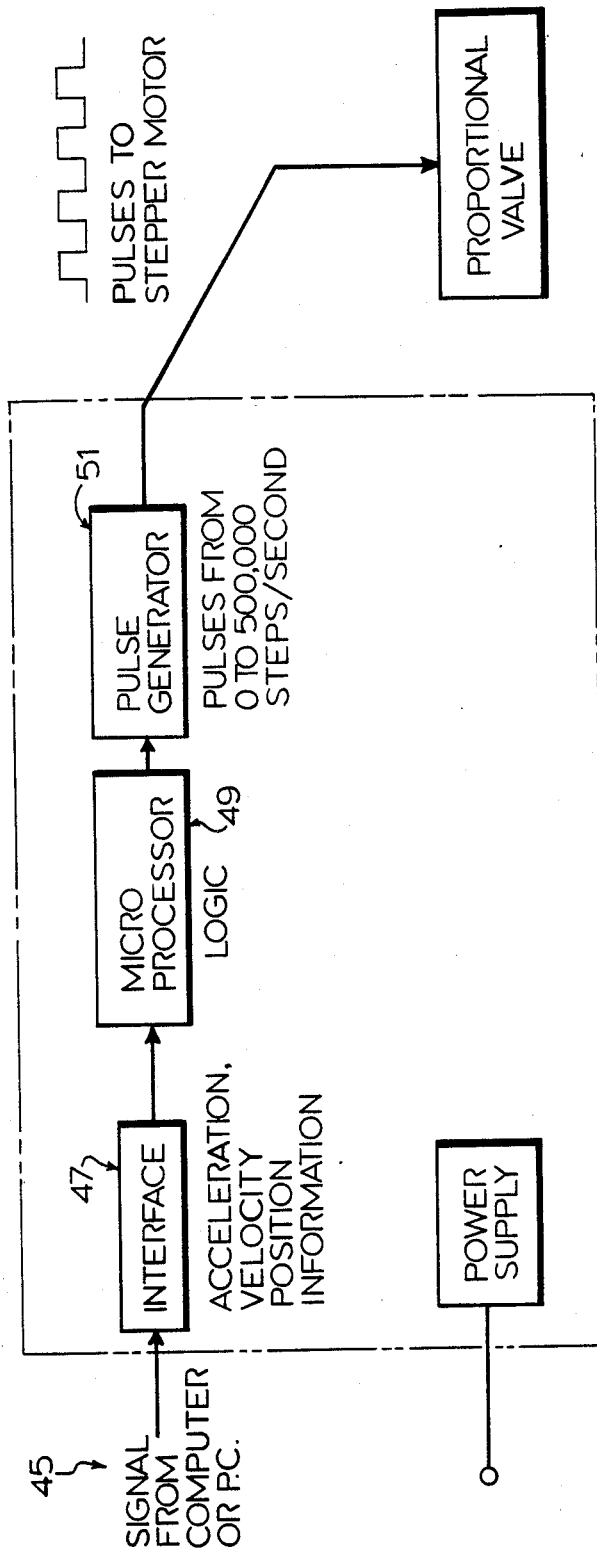
FIG. 7 is a schematic description of an open loop system for the accurate control of the position of a valve plate.

With reference to FIG. 7 there is shown in schematic form a system for controlling the stepping motor 31 in response to control signals 45 from an operator. Programmable control signals 45 from a user provide instructions to microprocessor logic 49 through an interface 47 interpreting angular acceleration, velocity and position information. Microprocessor 49 uses interface 47 output comprising angular acceleration, velocity and position information to generate output signals to pulse generator 51. Pulse generator 51 sends the required number of signals to the stepper motor 31 at a frequency sufficient to activate the stepper motor at a predetermined acceleration, angular velocity and duration. A feed back signal to constantly determine the position of the valve plate 21 is not necessary since when the stepper motor 31 is not energized or rotating, it is mechanically centered automatically to a null ($\phi$) position to which programmable control signals 45 are always summed.

The embodiments of the invention in which an exclusive property or privilege is claimed are as follows:

1. A rotary valve comprising: (a) a valve body; (b) a pluraltiy of fluid conduits passing through the valve body comprising supply ports and service ports, each port presenting an orifice to one plane of the valve body; (c) a rotatable valve plate for directing multiple flow paths from the plurality of supply ports to the plurality of service ports, the valve plate having a plurality of fluid channels abutting the one plane of the valve body for rotational alignment of the fluid channels with the supply ports and service ports; (d) a stepper motor having an output shaft mechanically coupled to the valve plate, the output shaft rotatable to rotate the valve plate through a range of predetermined positions; (e) mechanical centering means for returning the valve plate to a predetermined closed position whenever the power is turned off or lost to the stepper motor, and (f) machine intelligence means for controlling the operation of the stepper motor linked to the valve plate, the machine intelligence means including means for registering the position of the valve plate when mechanically returned to a predetermined closed position, determining the required number of electrical pulses at the desired frequency sufficient to activate the stepper motor for a predetermined number of degrees of rotation of the output shaft to advance or return (in clockwise or counterclockwise rotation) the valve plate to a desired position, whereby the stepping motor will advance and stop the valve plate at the desired position without feedback sensors to constantly measure the actual position of the valve plate.

* * * * *